US 12,025,237 B2

(12) United States Patent
Kurihara et al.

(10) Patent No.: US 12,025,237 B2
(45) Date of Patent: Jul. 2, 2024

(54) CAPACITY CONTROL VALVE

(71) Applicant: EAGLE INDUSTRY CO., LTD., Tokyo (JP)

(72) Inventors: Daichi Kurihara, Tokyo (JP); Kohei Fukudome, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 17/926,526

(22) PCT Filed: May 24, 2021

(86) PCT No.: PCT/JP2021/019528
§ 371 (c)(1),
(2) Date: Nov. 18, 2022

(87) PCT Pub. No.: WO2021/241477
PCT Pub. Date: Dec. 2, 2021

(65) Prior Publication Data
US 2023/0194007 A1    Jun. 22, 2023

(30) Foreign Application Priority Data
May 25, 2020 (JP) ................................. 2020-090664

(51) Int. Cl.
*F16K 11/07* (2006.01)
*F04B 27/18* (2006.01)
(Continued)

(52) U.S. Cl.
CPC ...... *F16K 31/0613* (2013.01); *F16K 11/0716* (2013.01); *F04B 27/18* (2013.01); *F16K 27/048* (2013.01)

(58) Field of Classification Search
CPC ............... F16K 31/0613; F16K 27/048; F16K 11/0716; F16K 11/10; F04B 27/18;
(Continued)

(56) References Cited

U.S. PATENT DOCUMENTS 2,267,515 A    12/1941  Wilcox
3,360,304 A    12/1967  Adams ..................... B61K 7/12
(Continued)

FOREIGN PATENT DOCUMENTS

EP    1835177    9/2007 .............. F04B 27/18
EP    2784320    10/2014 .............. F04B 27/18
(Continued)

OTHER PUBLICATIONS

International Preliminary Report on Patentability issued in PCT/JP2021/019528, dated Dec. 8, 2022, with English translation, 6 pages.
(Continued)

*Primary Examiner* — Kelsey E Cary
(74) *Attorney, Agent, or Firm* — HAYES SOLOWAY P.C.

(57) ABSTRACT

A capacity control valve includes a valve housing. A main valve including a valve body is driven by a solenoid, and a main valve seat which is provided between a discharge port and a control port and with which the valve body 51 is allowed to contact. A pressure sensitive valve member forming a pressure sensitive valve with a pressure sensitive body is disposed in a pressure sensitive chamber. The control port and a suction port communicate through an intermediate communication passage by opening the pressure sensitive valve. A slide valve body slides relative to the pressure sensitive valve member to open and close a through-hole communicating with the intermediate communication passage. The slide valve body partitions the pressure sensitive chamber into a Pd side space and a Pc side
(Continued)

space, and a Pd-Pc flow passage providing communication between two spaces and is formed in the slide valve body.

20 Claims, 10 Drawing Sheets

(51) Int. Cl.
  *F16K 31/06* (2006.01)
  *F16K 27/04* (2006.01)
(58) Field of Classification Search
  CPC .. F04B 27/16; F04B 27/1804; F04B 27/0895; F04B 27/1009; F04B 49/22; F04B 2027/1809; F04B 2027/1813; F04B 2027/1827; F04B 2027/1831; F04B 2027/1822; F04B 2027/1881; F04B 2027/1877; F04B 2027/1868; F04B 2027/1859; F04B 2027/1854; F04B 2027/1845
  See application file for complete search history.

(56) References Cited

U.S. PATENT DOCUMENTS

| | | | |
|---|---|---|---|
| 4,579,145 A | 4/1986 | Lieber | F16H 61/0251 |
| 4,615,358 A | 10/1986 | Hammond | F15B 13/0402 |
| 4,895,192 A | 1/1990 | Mortenson | F01M 11/04 |
| 4,917,150 A | 4/1990 | Koch | F16K 31/0606 |
| 4,979,542 A | 12/1990 | Mesenich | F02M 47/027 |
| 4,998,559 A | 3/1991 | McAuliffe | F16H 61/0251 |
| 5,048,790 A | 9/1991 | Wells | F16K 31/383 |
| 5,060,695 A | 10/1991 | McCabe | G05D 16/2024 |
| 5,217,047 A | 6/1993 | McCabe | F16H 61/0251 |
| 5,286,172 A | 2/1994 | Taguchi | F04B 1/26 |
| 5,778,932 A | 7/1998 | Alexander | G05D 16/2024 |
| 6,161,585 A | 12/2000 | Kolchinsky | G05D 16/2024 |
| 6,354,811 B1 | 3/2002 | Ota et al. | 417/222.2 |
| 6,358,017 B1 | 3/2002 | Ota et al. | 417/222.2 |
| 6,361,283 B1 | 3/2002 | Ota et al. | 417/222.2 |
| 6,434,956 B1 | 8/2002 | Ota | 62/133 |
| 7,014,427 B1 | 3/2006 | Hirota | 417/218 |
| 8,021,124 B2 | 9/2011 | Umemura et al. | 417/222.2 |
| 8,225,818 B1 | 7/2012 | Stephens | F15B 13/0442 |
| 9,022,346 B2 | 5/2015 | Najmolhoda | F16K 31/0613 |
| 9,027,598 B2 | 5/2015 | Schneider | F16K 31/0613 |
| 9,453,518 B2 | 9/2016 | Schulz | F15B 13/043 |
| 2002/0134444 A1 | 9/2002 | Isobe | F16K 27/041 |
| 2004/0060604 A1 | 4/2004 | Uemura et al. | 137/595 |
| 2004/0120829 A1 | 6/2004 | Pitla et al. | F04B 1/26 |
| 2005/0076329 A1 | 4/2005 | Yamamoto | F16K 31/0624 |
| 2005/0265853 A1 | 12/2005 | Hirota | F04B 1/12 |
| 2006/0165534 A1 | 7/2006 | Umemura et al. | F04B 1/26 |
| 2006/0218953 A1 | 10/2006 | Hirota | 62/228.5 |
| 2009/0183786 A1 | 7/2009 | Iwa et al. | 137/487.5 |
| 2009/0256091 A1 | 10/2009 | Nordstrom | F16K 31/0613 |
| 2011/0089352 A1 | 4/2011 | Morgan | F16K 11/0716 |
| 2012/0198992 A1 | 8/2012 | Futakuchi et al. | 91/505 |
| 2014/0130916 A1 | 5/2014 | Saeki et al. | F16K 31/0613 |
| 2014/0369862 A1 | 12/2014 | Ota et al. | F04B 27/18 |
| 2015/0027573 A1 | 1/2015 | Ochiai | F15B 13/0402 |
| 2015/0044065 A1 | 2/2015 | Ota | F04B 27/18 |
| 2015/0044067 A1 | 2/2015 | Ota | F04B 27/1804 |
| 2015/0211506 A1 | 7/2015 | Shirafuji et al. | F04B 17/1804 |
| 2015/0345655 A1 | 12/2015 | Higashidozono et al. | F16K 31/0624 |
| 2017/0356430 A1 | 12/2017 | Irie et al. | F04B 27/1804 |
| 2018/0156345 A1 | 6/2018 | Kanda | F15B 13/0431 |
| 2019/0078562 A1* | 3/2019 | Hayama | F16K 11/0716 |
| 2019/0162175 A1 | 5/2019 | Higashidozono et al. | F04B 27/18 |
| 2020/0191139 A1 | 6/2020 | Warren et al. | F04B 49/22 |
| 2021/0180715 A1 | 6/2021 | Hayama et al. | F16K 31/122 |
| 2021/0372396 A1* | 12/2021 | Kurihara | F04B 49/12 |

FOREIGN PATENT DOCUMENTS

| | | | |
|---|---|---|---|
| EP | 3431760 | 1/2019 | F04B 27/18 |
| JP | 5306679 | 11/1993 | F04B 27/08 |
| JP | 6-200875 | 7/1994 | F04B 27/08 |
| JP | 3088536 | 7/2000 | F04B 27/08 |
| JP | 2000-345961 | 12/2000 | F04B 27/14 |
| JP | 2001-73939 | 3/2001 | F04B 27/14 |
| JP | 2001-107854 | 4/2001 | F04B 27/14 |
| JP | 2001-132632 | 5/2001 | F04B 27/14 |
| JP | 3581598 | 7/2004 | F04B 29/10 |
| JP | 2006-17035 | 1/2006 | F04B 27/14 |
| JP | 2006-52648 | 2/2006 | F04B 27/14 |
| JP | 2006-170140 | 6/2006 | F04B 27/14 |
| JP | 2006-307828 | 11/2006 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 2011-94554 | 5/2011 | F04B 27/08 |
| JP | 5167121 | 12/2012 | F04B 27/14 |
| JP | 5557901 | 6/2014 | F04B 27/14 |
| JP | 2014-190247 | 10/2014 | F04B 27/14 |
| JP | 2015-1168 | 1/2015 | F04B 27/14 |
| JP | 2015-34509 | 2/2015 | F04B 27/14 |
| JP | 2015-34510 | 2/2015 | F04B 27/14 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-021646 | 2/2018 | F04B 27/18 |
| JP | 2018-40385 | 3/2018 | F16K 31/06 |
| JP | 2018-145877 | 9/2018 | F04B 27/12 |
| WO | WO2007119380 | 10/2007 | F04B 27/14 |
| WO | WO2013109005 | 7/2013 | F04B 27/14 |
| WO | WO2014091975 | 6/2014 | F04B 27/14 |
| WO | WO2014119594 | 8/2014 | F04B 27/14 |
| WO | WO2017057160 | 4/2017 | F04B 27/18 |
| WO | WO2017159553 | 9/2017 | F04B 27/18 |
| WO | WO2018043186 | 3/2018 | F04B 27/18 |
| WO | WO2018207461 | 11/2018 | F04B 27/18 |
| WO | WO2019131703 | 7/2019 | F04B 27/18 |
| WO | WO2019167912 | 2/2021 | F04B 27/18 |

OTHER PUBLICATIONS

International Search Report and Written Opinion issued in PCT/JP2021/019528, dated Jul. 6, 2021, with English translation, 10 pages.

International Preliminary Report on Patentability issued in PCT/JP2021/019529, dated Dec. 8, 2022, with English translation, 6 pages.

International Search Report and Written Opinion issued in PCT/JP2021/019529, dated Jul. 5, 2021, with English translation, 10 pages.

* cited by examiner

CAPACITY CONTROL VALVE

TECHNICAL FIELD

The present invention relates to a capacity control valve that variably controls capacity of a working fluid, for example, to a capacity control valve that controls a discharge amount of a variable displacement compressor used for an air conditioning system of an automobile according to pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve to be driven to open and close by electromagnetic force.

At the time of continuously driving the variable displacement compressor, the capacity control valve performs normal control in which energization is controlled by a control computer, a valve body is moved in an axial direction by electromagnetic force generated in a solenoid, and a main valve provided between a discharge port through which a discharge fluid of the discharge pressure Pd passes and a control port through which a control fluid of the control pressure Pc passes is opened and closed to adjust the control pressure Pc of the control chamber of the variable displacement compressor.

During normal control of the capacity control valve, the pressure of the control chamber in the variable displacement compressor is appropriately controlled, and the tilt angle of the swash plate with respect to the rotating shaft is continuously changed to change the stroke amount of the pistons and to control the amount of discharge of the fluid to the discharge chamber, so that the air conditioning system is adjusted to have a target cooling capacity. In addition, when the variable displacement compressor is driven at the maximum capacity, the main valve of the capacity control valve is closed to lower the pressure of the control chamber, so that the tilt angle of the swash plate is maximized.

In addition, a configuration has been known in which an auxiliary communication passage is formed that provides communication between a control port and a suction port of a capacity control valve, and a refrigerant of a control chamber of a variable displacement compressor is discharged to a suction chamber of the variable displacement compressor through the control port, the auxiliary communication passage, and the suction port at a start-up, to rapidly lower the pressure of the control chamber at the start-up, so that the responsiveness of the variable displacement compressor is improved (refer to Patent Citation 1).

CITATION LIST

Patent Literature

Patent Citation 1: JP 5167121 B2 (PAGE 7 and FIG. 2)

SUMMARY OF INVENTION

Technical Problem

However, according to the configuration disclosed in Patent Citation 1, a fluid discharge function at a start-up is good, but at the time of continuously driving the variable displacement compressor, the auxiliary communication passage allows communication, and the refrigerant flows from the control port into the suction port, so that the refrigerant circulation amount increases and the operating efficiency of the variable displacement compressor decreases, which is a problem.

The present invention is conceived in view of such a problem, and an object of the present invention is to provide a capacity control valve having a fluid discharge function at a start-up and having good operating efficiency.

Solution to Problem

In order to solve the foregoing problem, according to the present invention, there is provided a capacity control valve including: a valve housing provided with a discharge port through which a discharge fluid of a discharge pressure passes, a suction port through which a suction fluid of a suction pressure passes, and a control port through which a control fluid of a control pressure passes; a main valve including a valve body driven by a solenoid, and a main valve seat which is provided between the discharge port and the control port and with which the valve body is allowed to come into contact; a pressure sensitive body disposed in a pressure sensitive chamber; and a pressure sensitive valve member extending from the valve body to the pressure sensitive chamber and forming a pressure sensitive valve, together with the pressure sensitive body. An intermediate communication passage is formed in the valve body and in the pressure sensitive valve member, and the control port and the suction port are allowed to communicate with each other through the intermediate communication passage by opening and closing of the pressure sensitive valve. The pressure sensitive valve member is provided with a through-hole communicating with the intermediate communication passage and has a slide valve body attached thereto such that the slide valve body slides relative to the pressure sensitive valve member in the pressure sensitive chamber to open and close the through-hole. The slide valve body partitions the pressure sensitive chamber into a Pd side space on a side of the discharge port and a Pc side space on a side of the control port, and a Pd-Pc flow passage providing communication between the Pd side space and the PC side space is formed in the slide valve body. According to the aforesaid feature of the present invention, the slide valve body partitions the pressure sensitive chamber into the Pd side space communicating with the discharge port and the Pc side space communicating with the control port, and when the main valve is controlled in an energized state, a flow of the fluid flowing from the discharge port to the control port due to opening of the main valve can be supplied through the Pd-Pc flow passage such as an opening or a cutout formed in the slide valve body, and the slide valve body is slid to the control port side using the force of the fluid, to close the through-hole of the pressure sensitive valve member and to shut off communication between the control port and the suction port, so that the fluid can be prevented from flowing into the suction port from the control port. On the other hand, when the main valve is closed at a start-up, the fluid of high pressure flows from the outside of the capacity control valve into the Pc side space of the pressure sensitive chamber through the control port to generate a differential pressure between the Pd side space and the Pc side space, and the slide valve body is slid to the discharge port side using the differential pressure, to open the through-hole of the pressure sensitive valve member and to provide communication between the control port and the suction port, so that the control pressure can be quickly lowered. In such a manner, the discharge of a liquid refrigerant and the operating efficiency at a start-up of the variable displacement compressor can be improved.

It may be preferable that the slide valve body slides along an outer peripheral surface of the pressure sensitive valve member. According to this preferable configuration, since the slide valve body slides along the pressure sensitive valve member, the slide valve body can reliably close the through-hole.

It may be preferable that the Pd-Pc flow passage is formed by a communication hole penetrating through the slide valve body in an axial direction. According to this preferable configuration, the amount of release of the fluid through the Pd-Pc flow passage of the slide valve body can be easily adjusted according to the number or the size of the communication holes, and the operation accuracy of the slide valve body can be improved.

It may be preferable that a plurality of the Pd-Pc flow passages are evenly disposed in a circumferential direction. According to this preferable configuration, since the slide valve body can receive forces due to the fluids in a well-balanced manner, the slide valve body can be stably operated.

It may be preferable that a projection is be provided between the slide valve body and a flange portion formed on a tip side of the pressure sensitive valve member. According to this preferable configuration, in a state where the through-hole of the pressure sensitive valve member is closed by the slide valve body, the projection prevents surface-to-surface contact between a side surface of the slide valve body and a side surface of the flange portion of the pressure sensitive valve member, so that the slide valve body can be easily separated from the pressure sensitive valve member, and the responsiveness of the slide valve body can be improved.

It may be preferable that the projection is formed in the slide valve body so as to protrude toward the flange portion. According to this preferable configuration, in a state where the through-hole of the pressure sensitive valve member is closed by the slide valve body, a large pressure receiving area can be secured by the side surface facing the Pc side space, so that the slide valve body is easily operated in an opening direction by a differential pressure.

It may be preferable that the valve housing is provided with a stopper that restricts movement of the slide valve body in an opening direction. According to this preferable configuration, since the stopper can specify the amount of movement of the slide valve body, the controllability of the slide valve body is high.

DESCRIPTION OF EMBODIMENTS

Modes for carrying out a capacity control valve according to the present invention will be described below based on an embodiment.

First Embodiment

Figure 1:
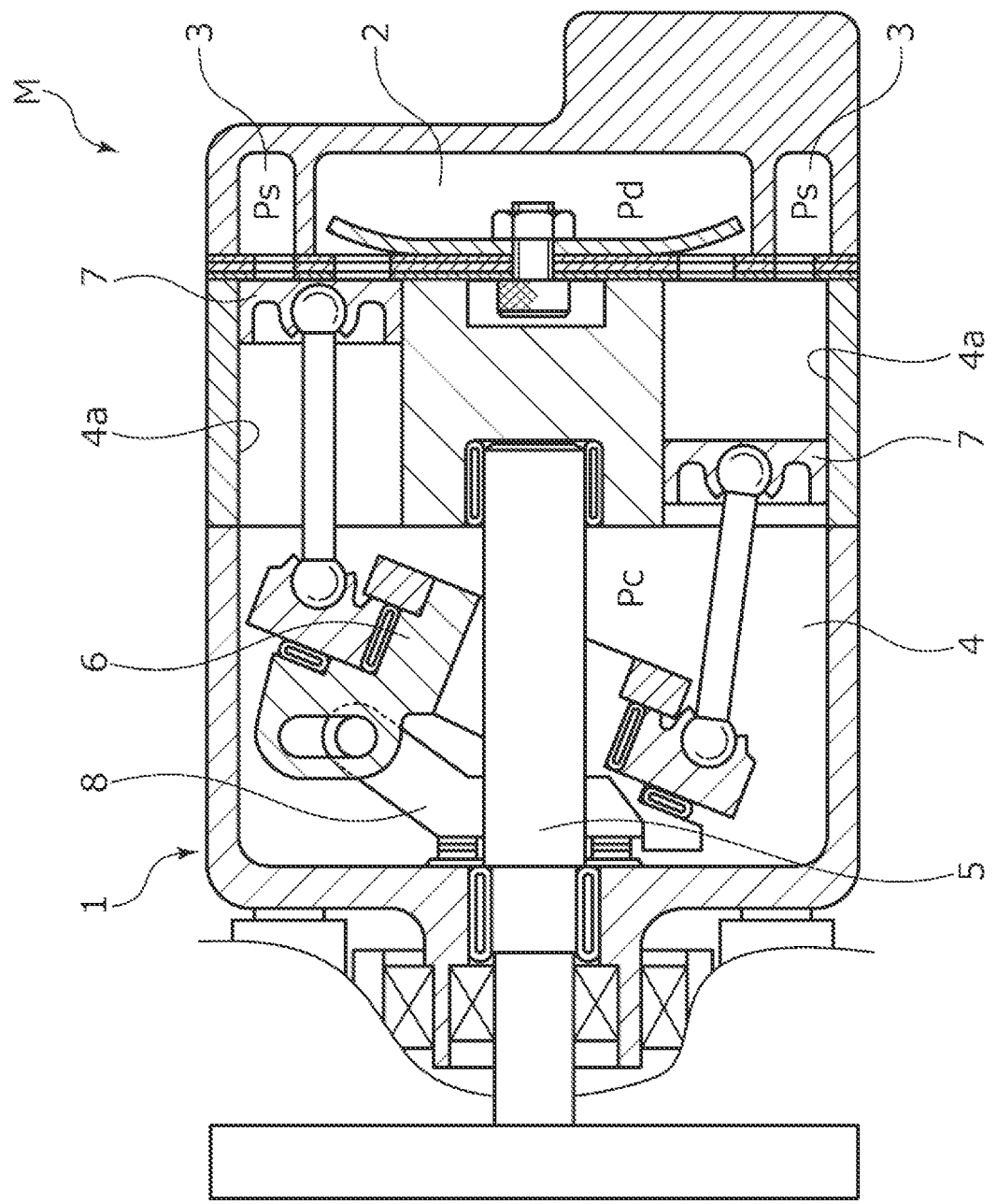
FIG. 1 is a schematic configuration view showing a swash plate-type variable displacement compressor into which a capacity control valve according to a first embodiment of the present invention is assembled.
Figure 2:
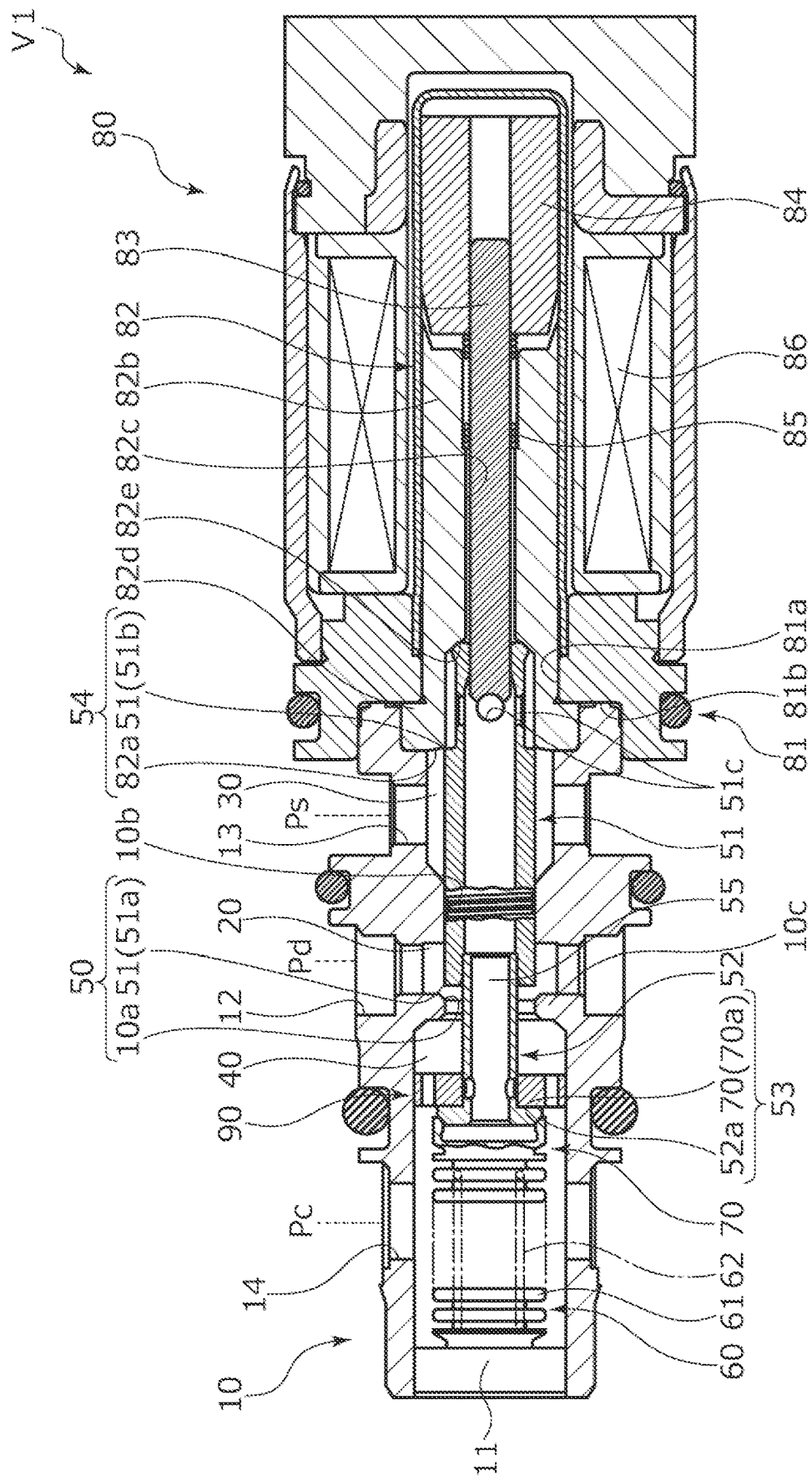
FIG. 2 is a cross-sectional view showing a state where a main valve is opened and through-holes of a pressure sensitive valve member are closed by a slide valve body in a non-energized state of the capacity control valve in the first embodiment.

A capacity control valve according to a first embodiment of the present invention will be described with reference to FIGS. 1 to 6. Hereinafter, a description will be given based on the assumption that the left and right sides when seen from the front side of FIG. 2 are left and right sides of the capacity control valve. In detail, a description will be given based on the assumption that the left side of the drawing sheet on which a pressure sensitive body 60 is disposed is the left side of the capacity control valve and the right side of the drawing sheet on which a solenoid 80 is disposed is the right side of the capacity control valve.

A capacity control valve V1 of the present invention is assembled into a variable displacement compressor M used for an air conditioning system of an automobile, etc., and by variably controlling the pressure of a working fluid (hereinafter, simply referred to as a "fluid") that is a refrigerant, controls the discharge amount of the variable displacement compressor M to adjust the air conditioning system to have a target cooling capacity.

First, the variable displacement compressor M will be described. As shown in FIG. 1, the variable displacement compressor M includes a casing 1 including a discharge chamber 2, a suction chamber 3, a control chamber 4, and a plurality of cylinders 4a. Incidentally, the variable displacement compressor M is provided with a communication passage (not shown) that provides direct communication between the control chamber 4 and the suction chamber 3, and the communication passage is provided with a fixed orifice that balances the pressures of the suction chamber 3 and the control chamber 4.

In addition, the variable displacement compressor M includes a rotating shaft 5 to be driven and rotated by an engine (not shown) installed outside the casing 1; a swash plate 6 coupled to the rotating shaft 5 so as to be tiltable by a hinge mechanism 8 in the control chamber 4; and a plurality of pistons 7 that are coupled to the swash plate 6 and that are reciprocatably fitted in the respective cylinders 4a, and appropriately controls pressure in the control chamber 4 by means of the capacity control valve V1 to be driven to open and close by electromagnetic force, while utilizing a suction pressure Ps of the suction chamber 3 that suctions the fluid, a discharge pressure Pd of the discharge chamber 2 that discharges the fluid pressurized by the pistons 7, and a control pressure Pc of the control chamber 4 that houses the swash plate 6, to continuously change the tilt angle of the swash plate 6, and thus to change the stroke amount of the pistons 7 and to control the discharge amount of the fluid. Incidentally, for convenience of description, the capacity control valve V1 assembled into the variable displacement compressor M is not shown in FIG. 1.

Specifically, the higher the control pressure Pc in the control chamber 4, the smaller the tilt angle of the swash plate 6 with respect to the rotating shaft 5, and thus the stroke amounts of the pistons 7 are reduced, and when the control pressure Pc is a certain pressure or higher, the swash plate 6 is substantially perpendicular to the rotating shaft 5, namely, is slightly tilted with respect to perpendicularity. At this time, since the stroke amount of the pistons 7 is minimized and the pressurization of the fluid in the cylinders 4a by the pistons 7 is minimized, the amount of discharge of the fluid to the discharge chamber 2 is reduced, and the cooling capacity of the air conditioning system is minimized. On the other hand, the lower the control pressure Pc in the control chamber 4 is, the larger the tilt angle of the swash plate 6 with respect to the rotating shaft 5 is to increase the stroke amount of the pistons 7, and when the control pressure Pc reaches a certain pressure or lower, the swash plate 6 has a maximum tilt angle with respect to the rotating shaft 5. In this case, since the stroke amounts of the pistons 7 are maximized and the pressurization of the fluid in the cylinders 4a by the pistons 7 is maximized, the discharge amount of the fluid to the discharge chamber 2 is increased, and the cooling capacity of the air conditioning system is maximized.

As shown in FIG. 2, the capacity control valve V1 assembled into the variable displacement compressor M controls an electric current that energizes a coil 86 forming the solenoid 80, to perform opening and closing control of a main valve 50 and an auxiliary valve 54 in the capacity control valve V1, and performs opening and closing control of a pressure sensitive valve 53 using the suction pressure Ps and controls the fluid flowing into the control chamber 4 or flowing out from the control chamber 4, to variably control the control pressure Pc in the control chamber 4.

In the present embodiment, the main valve 50 includes a main and auxiliary valve body 51 serving as a valve body and a main valve seat 10a that is formed at an annular protrusion 10c having an isosceles trapezoidal shape in a cross-sectional view and protruding from an inner peripheral surface of a valve housing 10 to a radially inner side, and an axially left end surface 51a of the main and auxiliary valve body 51 comes into contact with and separates from the main valve seat 10a to open and close the main valve 50. The auxiliary valve 54 includes the main and auxiliary valve body 51 and an auxiliary valve seat 82a formed in an opening end surface of a fixed iron core 82, namely, in an axially left end surface of the fixed iron core 82, and a step portion 51b on an axially right side of the main and auxiliary valve body 51 comes into contact with and separates from the auxiliary valve seat 82a to open and close the auxiliary valve 54. The pressure sensitive valve 53 includes an adapter 70 of the pressure sensitive body 60 and a pressure sensitive valve seat 52a formed at an axially left end surface of a pressure sensitive valve member 52, and an axially right end surface 70a of the adapter 70 comes into contact with and separates from the pressure sensitive valve seat 52a to open and close the pressure sensitive valve 53.

Next, a structure of the capacity control valve V1 will be described. As shown in FIG. 2, the capacity control valve V1 mainly includes the valve housing 10 made of a metallic material or a resin material; the main and auxiliary valve body 51 and the pressure sensitive valve member 52 disposed inside the valve housing 10 so as to be reciprocatable in an axial direction; the pressure sensitive body 60 that applies a biasing force to the main and auxiliary valve body 51 and to the pressure sensitive valve member 52 to the right in the axial direction according to the suction pressure Ps; the solenoid 80 connected to the valve housing 10 to exert a driving force on the main and auxiliary valve body 51 and on the pressure sensitive valve member 52; and a slide valve body 90 provided to be reciprocatable relative to the pressure sensitive valve member 52 in the axial direction by opening and closing of the main valve 50. Since the slide valve body 90 opens and closes a flow passage between an auxiliary valve chamber 30 and a pressure sensitive chamber 40 that have the suction pressure Ps and the control pressure Pc, respectively, when the slide valve body 90 reciprocates, it can be said that the slide valve body 90 forms a CS valve, together with the pressure sensitive valve member 52, the CS valve rapidly releasing the control pressure Pc of the control chamber 4 to the suction chamber 3 through a through-hole 52d of the pressure sensitive valve member 52 and through an intermediate communication passage 55 to be described later.

As shown in FIG. 2, the solenoid 80 mainly includes a casing 81 including an opening portion 81a that is open to the left in the axial direction; the fixed iron core 82 having a substantially cylindrical shape and being inserted into the opening portion 81a of the casing 81 from the left in the axial direction to be fixed to a radially inner side of the casing 81; a drive rod 83 which is reciprocatable in the axial direction on the radially inner side of the fixed iron core 82 and of which an axially left end portion is connected and fixed to the main and auxiliary valve body 51; a movable iron core 84 firmly fixed to an axially right end portion of the drive rod 83; a coil spring 85 provided between the fixed iron core 82 and the movable iron core 84 to bias the movable iron core 84 to the right in the axial direction; and a coil 86 for excitation wound on an outer side of the fixed iron core 82 with a bobbin interposed therebetween.

A recessed portion 81b that is recessed to the right in the axial direction is formed on a radially inner side of an axially left side of the casing 81, and an axially right end portion of the valve housing 10 is inserted and fixed to the recessed portion 81b in a substantially sealed state.

The fixed iron core 82 is made of a rigid body that is a magnetic material such as iron or silicon steel, and includes a cylindrical portion 82b which extends in the axial direction and in which an insertion hole 82c into which the drive rod 83 is inserted is formed, and a flange portion 82d having an annular shape and extending from an outer peripheral surface of an axially left end portion of the cylindrical portion 82b in a radially outward direction, and a recessed portion 82e that is recessed to the right in the axial direction is formed on a radially inner side of an axially left side of the cylindrical portion 82b.

As shown in FIG. 2, a Pd port 12 that is a discharge port communicating with the discharge chamber 2 of the variable displacement compressor M, a Ps port 13 that is a suction port communicating with the suction chamber 3 of the variable displacement compressor M, and a Pc port 14 that is a control port communicating with the control chamber 4 of the variable displacement compressor M are formed in the valve housing 10.

A partition adjustment member 11 is press-fitted into an axially left end portion of the valve housing 10 in a substantially sealed state, so that the valve housing 10 has a substantially bottomed cylindrical shape. Incidentally, the partition adjustment member 11 can adjust the installation position of the valve housing 10 in the axial direction to adjust a biasing force of the pressure sensitive body 60.

Inside the valve housing 10, a main valve chamber 20 which communicates with the Pd port 12 and in which an axially left end surface 51a side of the main and auxiliary valve body 51 is disposed, the auxiliary valve chamber 30 which communicates with the Ps port 13 and in which a back pressure side of the main and auxiliary valve body 51, namely, the step portion 51b on the axially right side of the main and auxiliary valve body 51 is disposed, and the pressure sensitive chamber 40 which communicates with the Pc port 14 and in which the pressure sensitive valve member 52, the slide valve body 90, and the pressure sensitive body 60 are disposed are formed.

In addition, the main and auxiliary valve body 51 and the pressure sensitive valve member 52 inserted and fixed to the main and auxiliary valve body 51 are disposed inside the valve housing 10 so as to be reciprocatable in the axial direction, and a guide hole 10b which has a small diameter and with which an outer peripheral surface of the main and auxiliary valve body 51 is in slidable contact in a substantially sealed state is formed at an axially right end portion of the inner peripheral surface of the valve housing 10. Further, inside the valve housing 10, the main valve chamber 20 and the auxiliary valve chamber 30 are partitioned off by the outer peripheral surface of the main and auxiliary valve body 51 and an inner peripheral surface of the guide hole 10b.

Incidentally, the inner peripheral surface of the guide hole 10b and the outer peripheral surface of the main and auxiliary valve body 51 are slightly separated from each other in a radial direction to form a very small gap therebetween, and the main and auxiliary valve body 51 is smoothly movable relative to the valve housing 10 in the axial direction.

As shown in FIG. 2, the pressure sensitive body 60 mainly includes a bellows core 61 in which a coil spring 62 is built-in, and the adapter 70 provided at an axially right end portion of the bellows core 61, and an axially left end surface of the bellows core 61 is fixed to the partition adjustment member 11.

In addition, the pressure sensitive body 60 is disposed in the pressure sensitive chamber 40, and the axially right end surface 70a of the adapter 70 is seated on the pressure sensitive valve seat 52a of the pressure sensitive valve member 52 by a biasing force of the coil spring 62 and the bellows core 61 to move the adapter 70 to the right in the axial direction. In addition, a force to the left in the axial direction is applied to the adapter 70 according to the suction pressure Ps in the intermediate communication passage 55.

As shown in FIG. 2, the main and auxiliary valve body 51 is formed in a substantially cylindrical shape. The pressure sensitive valve member 52 that is separately formed in a flanged cylindrical shape and in a substantially turret shape in a side view is inserted and fixed to an axially left end portion of the main and auxiliary valve body 51 in a substantially sealed state, and the drive rod 83 is inserted and fixed to an axially right end portion of the main and auxiliary valve body 51 in a substantially sealed state. The main and auxiliary valve body 51, the pressure sensitive valve member 52, and the drive rod 83 are movable together in the axial direction.

In addition, since the labyrinth effect of annular grooves formed in the outer peripheral surface of the main and auxiliary valve body 51 can suppress the leakage of the fluid from the main valve chamber 20 to the auxiliary valve chamber 30, the discharge pressure Pd of the discharge fluid supplied from the discharge chamber 2 to the main valve chamber 20 via the Pd port 12 is maintained.

Incidentally, hollow holes inside the main and auxiliary valve body 51 and inside the pressure sensitive valve member 52 are connected to each other to form the intermediate communication passage 55 penetrating therethrough in the axial direction. Incidentally, the intermediate communication passage 55 communicates with the auxiliary valve chamber 30 via a plurality of through-holes 51c penetrating through the axially right end portion of the main and auxiliary valve body 51 in the radial direction.

As shown in FIGS. 2 to 5, the pressure sensitive valve member 52 is made of a metallic material or a resin material, and is formed in a flanged cylindrical shape and in a substantially turret shape in a side view that includes a base portion 52b having a cylindrical shape of which an axially right end portion is inserted and fixed to the main and auxiliary valve body 51 in a substantially sealed state and to which the slide valve body 90 is externally fitted, and a flange portion 52c which extends from an outer peripheral surface of an axially left end portion of the base portion 52b in the radially outward direction and in which the pressure sensitive valve seat 52a that comes into contact with and separates from the axially right end surface 70a of the adapter 70 is formed. Incidentally, a plurality of the through-holes 52d penetrating through the base portion 52b in the radial direction and communicating with the intermediate communication passage 55 are formed at the axially left end portion of the base portion 52b.

Figure 3:
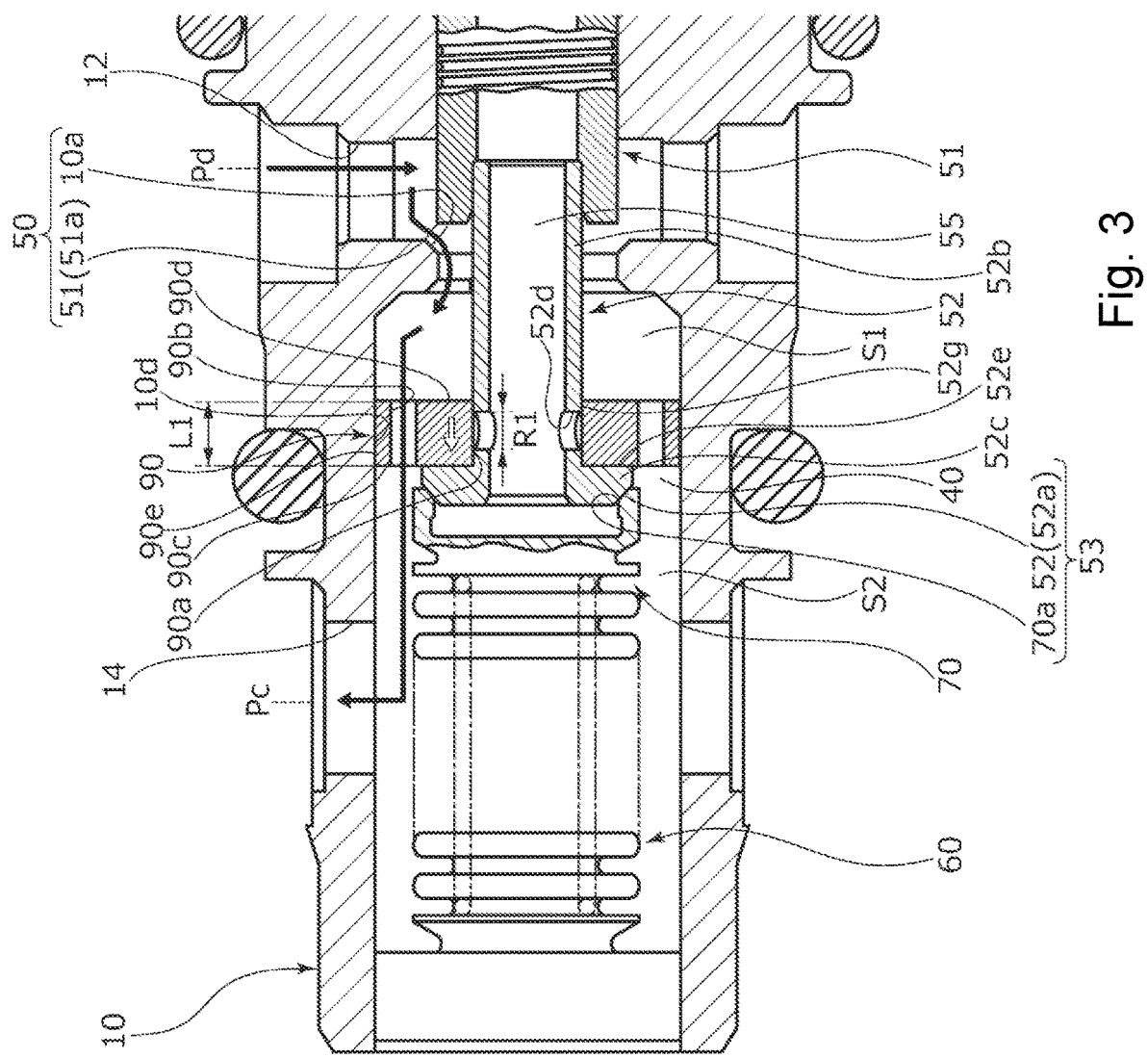
FIG. 3 is an enlarged cross-sectional view of FIG. 2.

As shown in FIGS. 2 to 5, the slide valve body 90 is formed as a member separated from the pressure sensitive valve member 52, is externally fitted to the base portion 52b of the pressure sensitive valve member 52, and is formed in an annular shape having a predetermined thickness dimension L1 in the axial direction (refer to FIG. 3). Incidentally, the thickness dimension L1 of the slide valve body 90 is larger than a diameter R1 (refer to FIG. 3) of the through-hole 52d of the pressure sensitive valve member 52 (i.e., L1>R1).

Figure 6:
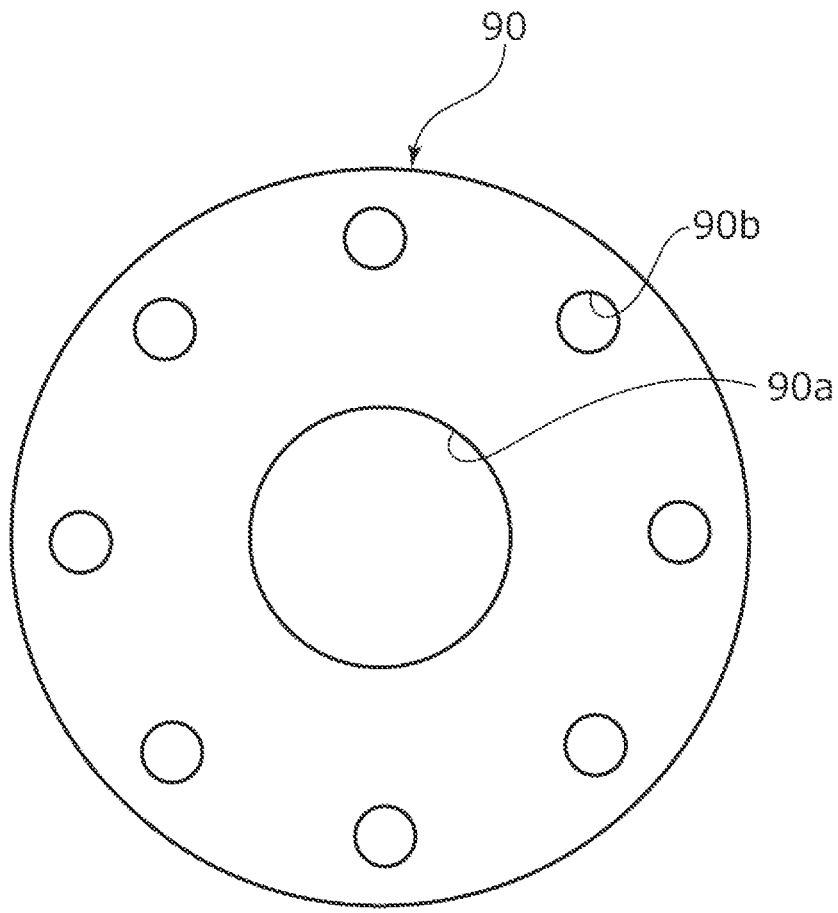
FIG. 6 is a side view showing a structure of the slide valve body in the first embodiment.

In addition, as shown in FIG. 6, a through-hole 90a into which the base portion 52b of the pressure sensitive valve member 52 is inserted is formed at the center of the slide valve body 90, and a plurality of communication holes 90b serving as Pd-Pc flow passages and penetrating through the slide valve body 90 in the axial direction are evenly disposed in a radially outer portion of the slide valve body 90 in a circumferential direction. Incidentally, in the present embodiment, eight communication holes 90b having the same diameter are evenly disposed in the slide valve body 90 in the circumferential direction, but the invention is not limited to the configuration, and the diameter, the number, and the disposition of the communication holes 90b may be freely configured.

In addition, as shown in FIGS. 2 to 5, an inner diameter of the slide valve body 90 is larger than an outer diameter of the base portion 52b of the pressure sensitive valve member 52, and an inner peripheral surface of the through-hole 90a of the slide valve body 90 (hereinafter, simply referred to as the "inner peripheral surface of the slide valve body 90") is slidable on an outer peripheral surface 52g of the base portion 52b of the pressure sensitive valve member 52. Accordingly, the reciprocation of the slide valve body 90 in the axial direction is guided by the outer peripheral surface 52g of the base portion 52b of the pressure sensitive valve member 52, and the tilting of the slide valve body 90 is suppressed. In addition, through-holes 52d of the pressure sensitive valve member 52 can be reliably closed by the slide valve body 90.

In addition, an outer diameter of the slide valve body 90 is larger than an outer diameter of the flange portion 52c of the pressure sensitive valve member 52, and an outer peripheral surface 90e of the slide valve body 90 is disposed close to an inner peripheral surface 10d of the valve housing 10. In detail, the outer peripheral surface 90e of the slide valve body 90 and the inner peripheral surface 10d of the valve housing 10 are slightly separated from each other in the radial direction to form a very small gap therebetween, and the slide valve body 90 is smoothly movable relative to the valve housing 10 in the axial direction. The very small gap formed between the outer peripheral surface 90e of the slide valve body 90 and the inner peripheral surface 10d of the valve housing 10 is formed to be larger than a very small gap formed between the inner peripheral surface of the slide valve body 90 and the outer peripheral surface 52g of the base portion 52b of the pressure sensitive valve member 52. Incidentally, the communication holes 90b are formed at a position on a radially outer side of the flange portion 52c of the pressure sensitive valve member 52.

In addition, the slide valve body 90 partitions the pressure sensitive chamber 40 into a Pd side space S1 communicating with the Pd port 12 on an axially right side of the slide valve body 90 and a Pc side space S2 communicating with the Pc port 14 on an axially left side of the slide valve body 90, and the Pd side space S1 and the Pc side space S2 communicate with each other through the communication holes 90b. Incidentally, the fluid moves between the Pd side space S1 and the Pc side space S2 mainly through the communication holes 90b, and the amount of release of the fluid through the very small gap formed between the outer peripheral surface 90e of the slide valve body 90 and the inner peripheral surface 10d of the valve housing 10 is a very small amount that does not affect a reciprocating operation of the slide valve body 90 to be described later.

In addition, when the slide valve body 90 closes the through-holes 52d of the pressure sensitive valve member 52 moving to the left in the axial direction (refer to FIGS. 2 to 4), a side surface 90c on the axially left side of the slide valve body 90 comes into contact with a side surface 52e on an axially right side of the flange portion 52c of the pressure sensitive valve member 52. Accordingly, an axial position of the slide valve body 90 when the through-holes 52d of the pressure sensitive valve member 52 are closed by the slide valve body 90 is determined.

In addition, when the slide valve body 90 closes the through-holes 52d of the pressure sensitive valve member 52 moving to the left in the axial direction, a radially outer side of the side surface 90c on the axially left side of the slide valve body 90 with respect to the flange portion 52c of the pressure sensitive valve member 52 is exposed to the Pc side space S2. On the other hand, the entirety of a side surface 90d on the axially right side of the slide valve body 90 from the radially inner side to a radially outer side is exposed to the Pd side space S1 regardless of movement of the slide valve body 90.

Incidentally, the through-holes 52d of the pressure sensitive valve member 52 are formed on an axially right side of the side surface 52e on the axially right side of the flange portion 52c, and until the slide valve body 90 moves to the axial position of axially left opening ends of the through-holes 52d from a state where the slide valve body 90 is in contact with the side surface 52e of the flange portion 52c of the pressure sensitive valve member 52, a state where the slide valve body 90 overlaps the through-holes 52d in the radial direction to close the through-holes 52d is maintained.

Next, operation of the capacity control valve V1, mainly operation of an opening and closing mechanism of the through-holes 52d of the pressure sensitive valve member 52 performed by the slide valve body 90 will be described in order of at a start-up and during normal control.

First, operation during normal control will be described. During normal control, the opening degree or the opening time of the main valve 50 is adjusted by duty control of the capacity control valve V1, to control the flow rate of the fluid from the Pd port 12 to the Pc port 14. At this time, the fluid that has flowed in from the Pd port 12 by opening of the main valve 50 flows to the Pc port 14 through the communication holes 90b of the slide valve body 90 (shown by solid arrows in FIG. 3). The side surface 90d on the axially right side of the slide valve body 90 receives the force of the fluid, so that a force to move the slide valve body 90 to the left in the axial direction acts on the slide valve body 90 (shown by a white arrow in FIG. 3), and the slide valve body 90 moves to the left in the axial direction to close the through-holes 52d of the pressure sensitive valve member 52 (refer to FIG. 3).

At this time, in addition to a force $F_f$ due to a flow of the fluid passing through the communication holes 90b generated by opening of the main valve 50, a force $F_{P1}$ due to the pressure of the fluid in the Pd side space S1 of the pressure sensitive chamber 40 act on a pressure-receiving surface of the slide valve body 90 toward the left in the axial direction, the pressure-receiving surface being formed by the side surface 90d on the axially right side of the slide valve body 90, and a force $F_{P2}$ due to the pressure of the fluid in the Pc side space S2 of the pressure sensitive chamber 40 acts on a pressure-receiving surface of the slide valve body 90 toward the right in the axial direction, the pressure-receiving surface being formed by the radially outer side of the side surface 90c on the axially left side of the slide valve body 90. Namely, a force $F_{SV}=F_f+F_{P1}-F_{P2}$ acts on the slide valve body 90 with the left defined as positive.

In detail, in the present embodiment, the fluid flowing into the Pd side space S1 is the discharge fluid supplied from the Pd port 12 by opening of the main valve 50, and has a higher pressure than the control fluid supplied to the Pc side space S2 from the Pc port 14, and the pressure-receiving surface of the side surface 90d on the axially right side of the slide valve body 90 on which the pressure of the fluid in the Pd side space S1 acts is formed to be larger than the side surface 90c on the axially left side of the slide valve body 90 on which the pressure of the fluid in the Pc side space S2 acts.

Namely, the force $F_{P1}$ due to the pressure of the fluid acting on the slide valve body 90 toward the left in the axial direction is larger than the force $F_{P2}$ due to the pressure of the fluid acting on the slide valve body 90 toward the right in the axial direction (i.e., $F_{P1}>F_{P2}$), and a closed state of the through-holes 52d of the pressure sensitive valve member 52 can be reliably maintained by a resultant force $F_f+F_{P1}$ of the force $F_{P1}$ and the force $F_f$ due to a flow of the fluid acting toward the left in the axial direction.

As described above, during normal control, when the slide valve body 90 closes the through-holes 52d of the pressure sensitive valve member 52, since a flow passage leading from the control chamber 4 to the suction chamber 3 through the Pc port 14, then through the pressure sensitive chamber 40, then through the through-holes 52d, then through the intermediate communication passage 55, then through the auxiliary valve chamber 30, and then through the Ps port 13 is not formed, the rate of outflow of the refrigerant from the control chamber 4 to the suction chamber 3 is reduced, so that the operating efficiency of the variable displacement compressor M can be improved.

Next, operation at a start-up will be described. After the variable displacement compressor M is left without being used for a long time, the discharge pressure Pd, the control pressure Pc, and the suction pressure Ps are substantially in equilibrium. Incidentally, although not shown for convenience of description, the fluid of high pressure in the control chamber 4 may be liquefied when the variable displacement compressor M is left in a stopped state for a long time, and at this time, due to the high suction pressure Ps in the intermediate communication passage 55, the pressure sensitive body 60 is contracted and actuated to separate the axially right end surface 70a of the adapter 70 from the pressure sensitive valve seat 52a of the pressure sensitive valve member 52, so that the pressure sensitive valve 53 is opened. As described above, for example, when the suction pressure Ps is high at a start-up, the liquid refrigerant in the control chamber 4 can be discharged to the suction chamber 3 via the intermediate communication passage 55 in a short time by opening of the pressure sensitive valve 53.

In a non-energized state of the capacity control valve V1, the movable iron core 84 is pressed to the right in the axial direction by a biasing force of the coil spring 85 forming the solenoid 80 or by the biasing force of the coil spring 62 and of the bellows core 61 that form the pressure sensitive body 60, so that the drive rod 83, the main and auxiliary valve body 51, and the pressure sensitive valve member 52 move to the right in the axial direction, the step portion 51b on the axially right side of the main and auxiliary valve body 51 is seated on the auxiliary valve seat 82a of the fixed iron core 82 to close the auxiliary valve 54, and the axially left end surface 51a of the main and auxiliary valve body 51 separates from the main valve seat 10a formed in the inner peripheral surface of the valve housing 10, to open the main valve 50 (refer to FIGS. 2 and 3). At this time, the slide valve body 90 is located on the left in the axial direction due to the force of the fluid supplied by opening of the main valve 50 described above, to close the through-holes 52d of the pressure sensitive valve member 52.

Figure 4:
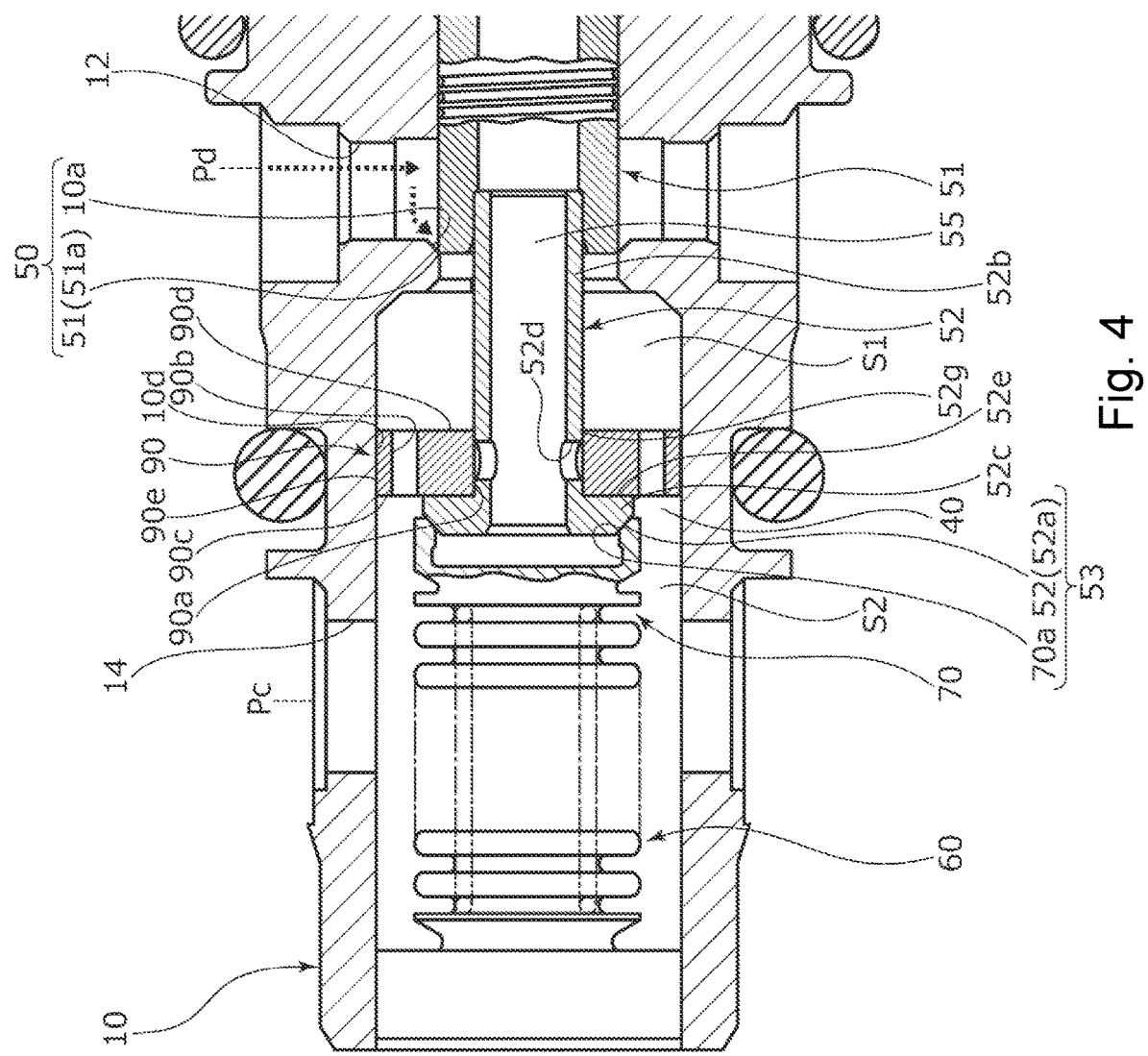
FIG. 4 is an enlarged cross-sectional view showing a state immediately after the main valve is closed at a start-up (energized state) of the capacity control valve and the variable displacement compressor in the first embodiment, namely, a state where the slide valve body and the pressure sensitive valve member move together from positions before the start-up to a pressure sensitive body side.

Due to electromagnetic force generated by the application of an electric current to the solenoid 80 when the variable displacement compressor M is started up and the capacity control valve V1 is energized, the movable iron core 84 is pulled to the left in the axial direction toward the fixed iron core 82, the drive rod 83 fixed to the movable iron core 84, the main and auxiliary valve body 51, and the pressure sensitive valve member 52 move together to the left in the axial direction, and the pressure sensitive body 60 is pressed and contracted to the left in the axial direction, so that the step portion 51b on the axially right side of the main and auxiliary valve body 51 separates from the auxiliary valve seat 82a to open the auxiliary valve 54, and the axially left end surface 51a of the main and auxiliary valve body 51 is seated on the main valve seat 10a to close the main valve 50 (refer to FIG. 4).

Incidentally, as shown in FIG. 4, immediately after the main valve 50 is closed, the force $F_f$ due to a flow of the fluid acting toward the left in the axial direction does not act on the slide valve body 90, but the slide valve body 90 moves, together with the pressure sensitive valve member 52, to the left in the axial direction from a position before the start-up (refer to FIG. 3) to a position where the axially left end surface 51a of the main and auxiliary valve body 51 is seated on the main valve seat 10a, and a closed state of the through-holes 52d of the pressure sensitive valve member 52 is maintained. Incidentally, the movement of the slide valve body 90 is slightly delayed with respect to the movement of the pressure sensitive valve member 52, but the slide valve body 90 moves due to inertia, and is pressed against the side surface 52e of the flange portion 52c of the pressure sensitive valve member 52.

In addition, immediately after the variable displacement compressor M is started up, the control pressure Pc of the control chamber 4 may increase, and in this case, the control fluid of the high control pressure Pc flows into the Pc side space S2 of the pressure sensitive chamber 40 from the Pc port 14.

Figure 5:
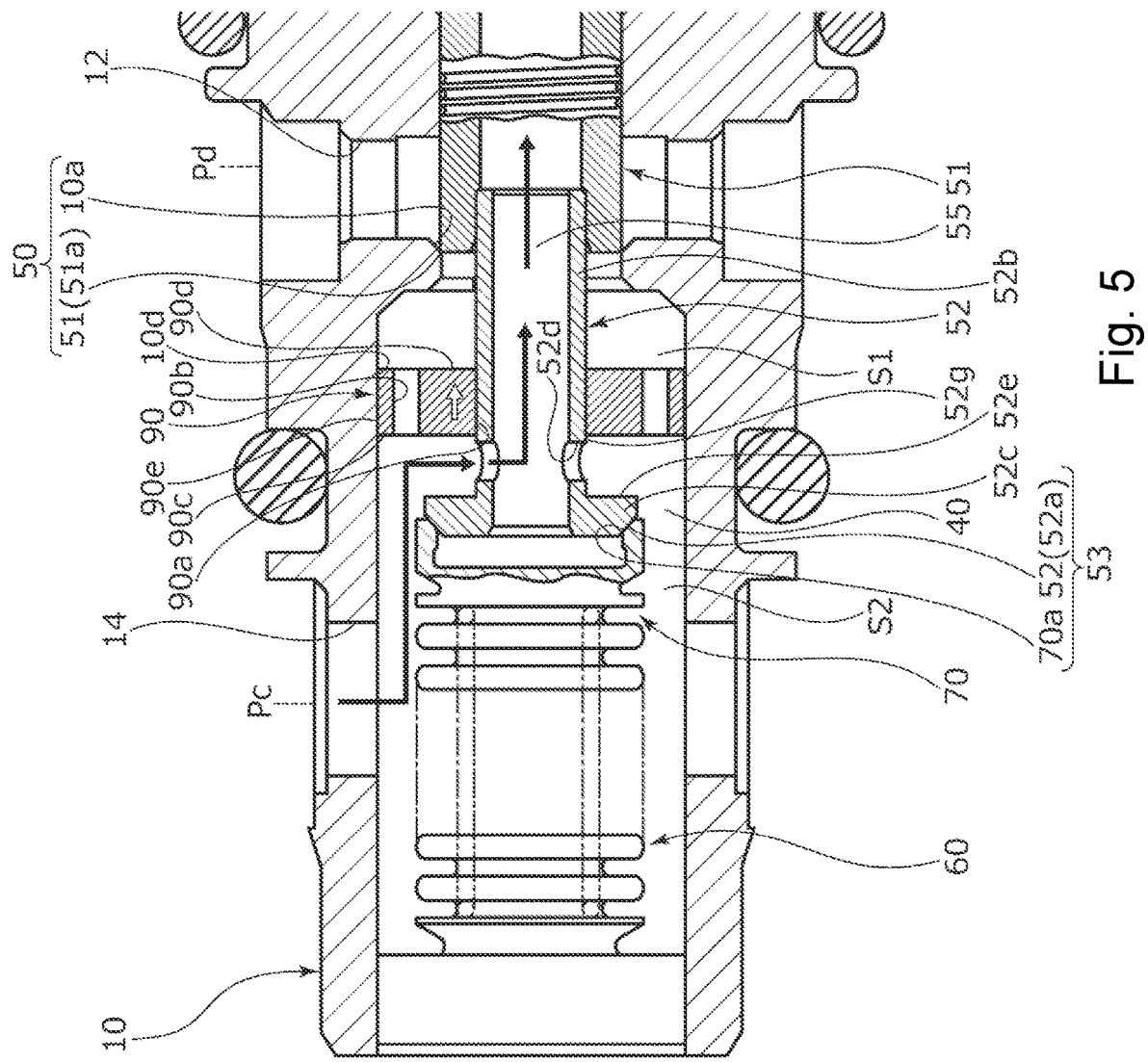
FIG. 5 is an enlarged cross-sectional view showing a state where the slide valve body moves from the state of FIG. 4 to a solenoid side to open the through-holes of the pressure sensitive valve member at the start-up (energized state) of the capacity control valve and the variable displacement compressor in the first embodiment.

Accordingly, the force $F_{P2}$ due to the pressure of the fluid acting on the slide valve body 90 toward the right in the axial direction is temporarily higher than the force $F_{P1}$, due to the pressure of the fluid acting on the slide valve body 90 toward the left in the axial direction (i.e., $F_{P1}<F_{P2}$), and due to a difference in the pressures acting on the side surfaces 90c and 90d on both axial sides of the slide valve body 90, a force to move the slide valve body 90 to the right in the axial direction acts on the slide valve body 90 (shown by a white arrow in FIG. 5), and the through-holes 52d of the pressure sensitive valve member 52 are opened (refer to FIG. 5). As described above, even when the through-holes 52d of the pressure sensitive valve member 52 are closed by the slide valve body 90 immediately after the main valve 50 is closed, the differential pressure generated between the Pd side space S1 and Pc side space S2 due to the start-up of the variable displacement compressor M moves the slide valve body 90 to the right in the axial direction, so that the through-holes 52d of the pressure sensitive valve member 52 can be reliably opened.

In addition, the fluid in the Pd side space S1 is compressed as the slide valve body 90 moves to the right in the axial direction. Accordingly, the pressure of the Pd side space S1 increases, and the slide valve body 90 is stopped at a position where the pressure of the Pd side space S1 and the pressure of the Pc side space S2 are balanced. Incidentally, while the main valve 50 is closed, a state where the pressure of the Pd side space S1 and the pressure of the Pc side space S2 are balanced and the slide valve body 90 is stopped is maintained, but when the main valve 50 is opened, and the discharge fluid flows into the Pd side space S1 from the Pd port 12, the balance between the pressure of the Pd side space S1 and the pressure of the Pc side space S2 is collapsed, and the slide valve body 90 moves to the left in the axial direction to close the through-holes 52d of the pressure sensitive valve member 52.

As described above, when the slide valve body 90 opens the through-holes 52d of the pressure sensitive valve member 52 at a start-up, the pressure sensitive chamber 40 communicates with the intermediate communication passage 55 via the through-holes 52d and the fluid flows (shown by solid arrows in FIG. 5). Namely, since the slide valve body 90 opens the through-holes 52d of the pressure sensitive valve member 52 to form a flow passage for the discharge of the fluid in order of the control chamber 4, the Pc port 14, the pressure sensitive chamber 40, the through-holes 52d, the intermediate communication passage 55, the auxiliary valve chamber 30, the Ps port 13, and the suction chamber 3, the liquefied fluid of the control chamber 4 can be discharged in a short time to improve responsiveness at a start-up. In addition, for example, as described above, even when the pressure sensitive valve 53 is not opened by the suction pressure Ps at a start-up, the slide valve body 90 can open the through-holes 52d of the pressure sensitive valve member 52 to form the flow passage for the discharge of the fluid from the control chamber 4 to the suction chamber 3 via the intermediate communication passage 55.

As described above, the slide valve body 90 partitions the pressure sensitive chamber 40 into the Pd side space S1 communicating with the Pd port 12 and the Pc side space S2 communicating with the Pc port 14. During normal control of the capacity control valve V1, a flow of the fluid flowing from the Pd port 12 to the Pc port 14 due to opening of the main valve 50 can be supplied through the communication holes 90b formed in the slide valve body 90, and the slide valve body 90 is moved to the left in the axial direction using the force of the fluid, to close the through-holes 52d of the pressure sensitive valve member 52. At a start-up, when the main valve 50 is closed and the control pressure Pc of the control chamber 4 is high, the fluid of high pressure flows into the Pc side space S2 of the pressure sensitive chamber 40 from the control chamber 4 of the variable displacement compressor M through the Pc port 14 to generate a differential pressure between the Pd side space S1 and the Pc side space S2, and the slide valve body 90 is moved to the right in the axial direction using the differential pressure, to open the through-holes 52d of the pressure sensitive valve member 52, so that the operating efficiency of the variable displacement compressor M can be improved.

In addition, the slide valve body 90 slides along the outer peripheral surface 52g of the base portion 52b of the pressure sensitive valve member 52, so that the through-holes 52d of the pressure sensitive valve member 52 can be reliably closed by the slide valve body 90.

In addition, it is preferable that the slide valve body 90 and the base portion 52b of the pressure sensitive valve member 52 are made of different materials, and the frictional resistance is reduced, so that the slide valve body 90 is smoothly slidable.

In addition, the communication holes 90b serving as the Pd-Pc flow passages which provide communication between the Pd port 12 and the Pc port 14 are formed in the slide valve body 90, and the amount of release of the fluid can be easily adjusted according to the number or the size of the communication holes 90b, and the operation accuracy of the slide valve body 90 can be improved.

In addition, since the plurality of communication holes 90b are evenly disposed in the circumferential direction, and the side surfaces 90c and 90d on both axial sides of the slide valve body 90 can receive forces due to the fluids in a well-balanced manner, the slide valve body 90 can be stably operated.

Figure 7:
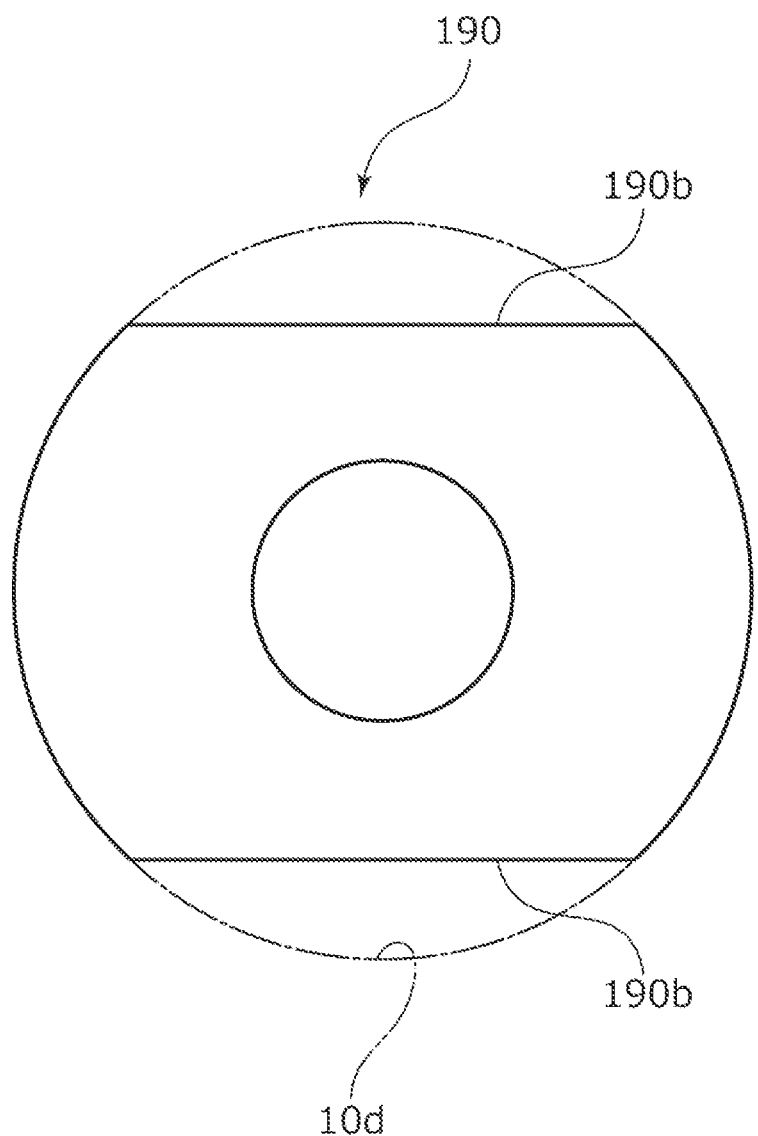
FIG. 7 is a side view showing a structure of a modification example of the slide valve body in the first embodiment.

Incidentally, as the Pd-Pc flow passages that provide communication between the Pd port 12 and the Pc port 14, as shown in a modification example of FIG. 7, a slide valve body 190 may be formed in a shape in which cutouts 190b are formed in an annular radially outer portion, so that Pd-Pc flow passages are formed by an outer peripheral surface of the slide valve body 190 and the inner peripheral surface 10d of the valve housing 10 (refer to two-dot chain lines in FIG. 7). In addition, the shape, the number, and the disposition of the cutouts 190b may be freely configured. Furthermore, the configuration of the cutout in the modification example is also applicable to a slide valve body in each of the following second to fourth embodiments.

In addition, since the thickness dimension L1 of the slide valve body 90 is larger than the diameter R1 of the through-hole 52d of the pressure sensitive valve member 52 (i.e., L1>R1) (refer to FIG. 3), and until the slide valve body 90 moves to the right in the axial direction by the predetermined distance or more from a state where the side surface 90c on the axially left side is in contact with the side surface 52e of the flange portion 52c of the pressure sensitive valve member 52, a state where the through-holes 52d of the pressure sensitive valve member 52 are closed can be maintained, even when the slide valve body 90 is slightly slide due to disturbance such as vibration, the through-holes 52d of the pressure sensitive valve member 52 are maintained in a closed state. For this reason, the capacity control valve V1 is resistant to disturbance, and has good control accuracy.

In addition, since the slide valve body 90 can be moved to the right in the axial direction by a differential pressure generated between the Pd side space S1 and the Pc side space S2 at a start-up, there is no need to separately provide biasing means such as a spring for opening the through-holes 52d of the pressure sensitive valve member 52, so that the number of components of the capacity control valve V1 can be reduced.

In addition, since the plurality of through-holes 52d of the pressure sensitive valve member 52 are formed, a wide cross-sectional area of the flow passage for the discharge of the fluid from the Pc port 14 to the suction chamber 3 can be secured. In addition, since the plurality of through-holes 52d are evenly disposed in the circumferential direction, the stroke of the slide valve body 90 can be shortened.

Second Embodiment

A capacity control valve according to a second embodiment of the present invention will be described with reference to FIG. 8. Incidentally, a description of duplicated configurations that are the same as the configurations of the first embodiment will be omitted.

Figure 8:
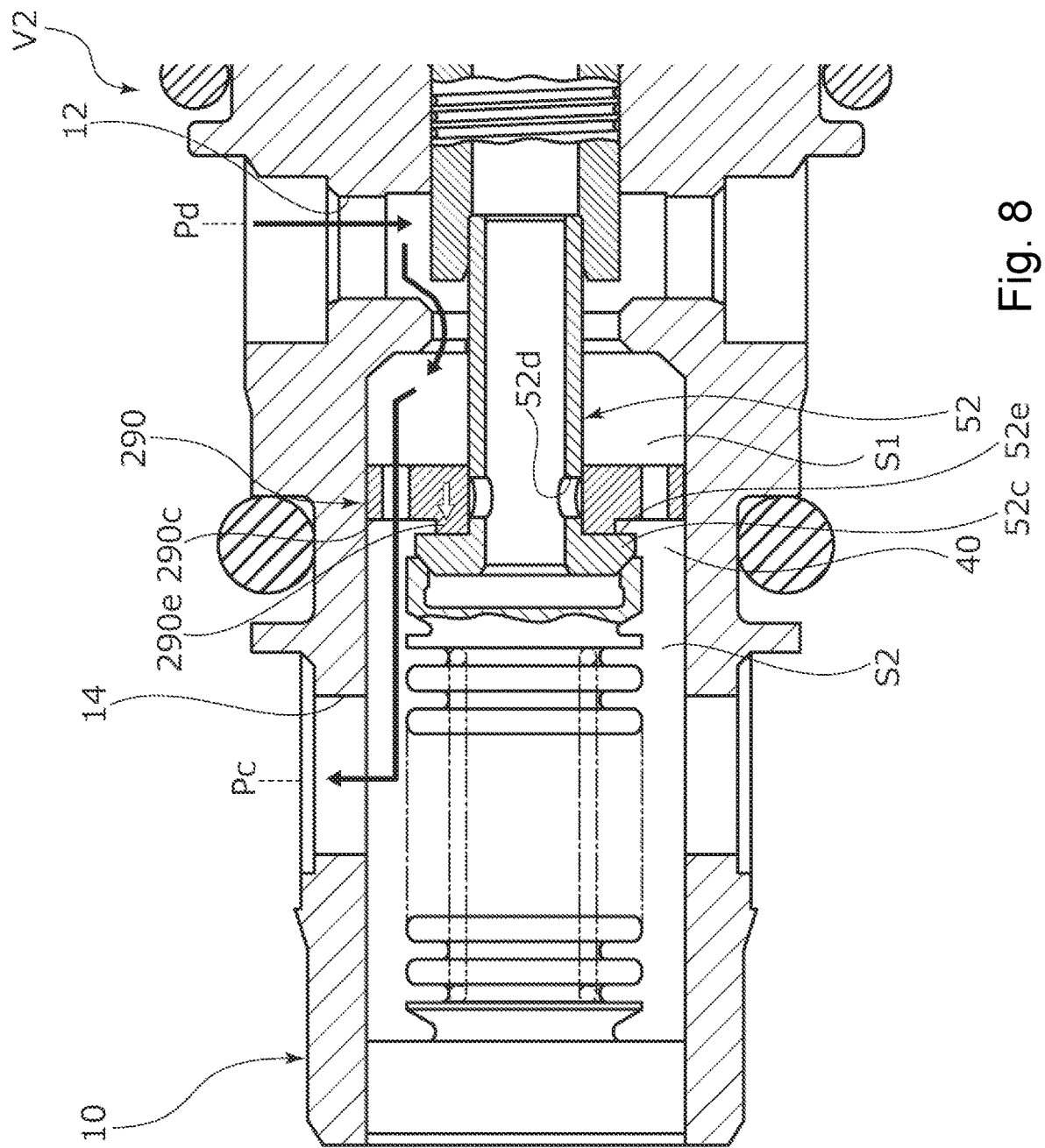
FIG. 8 is an enlarged cross-sectional view showing a state where a main valve is opened and through-holes of a pressure sensitive valve member are closed by a slide valve body in a non-energized state of a capacity control valve according to a second embodiment of the present invention.

As shown in FIG. 8, in a capacity control valve V2 of the second embodiment, a slide valve body 290 is integrally provided with a projection 290e having an annular shape and protruding from a radially inner portion of a side surface 290c on an axially left side to the left in the axial direction.

Incidentally, the projection 290e is not limited to being formed in an annular shape, and a plurality of the projections 290e may be evenly disposed in the circumferential direction. In addition, a member separated from the slide valve body 290 may be fixed to the side surface 290c to form the projection 290e.

Accordingly, in a state where the through-holes 52d of the pressure sensitive valve member 52 are closed by the slide valve body 290, a tip surface of the projection 290e is in contact with the side surface 52e of the flange portion 52c of the pressure sensitive valve member 52 to prevent surface-to-surface contact between the side surface 290c on the axially left side of the slide valve body 290 and the side surface 52e of the flange portion 52c of the pressure sensitive valve member 52, so that the slide valve body 290 can be easily separated from the pressure sensitive valve member 52, and the responsiveness of the slide valve body 290 can be improved.

In addition, since the projection 290e is provided on a radially inner side of the slide valve body 290, in a state where the through-holes 52d of the pressure sensitive valve member 52 are closed by the slide valve body 290, a large pressure receiving area up to the radially inner side can be secured by the side surface 290c exposed to the Pc side space S2, so that the slide valve body 290 is easily operated in an opening direction using a differential pressure generated between the Pd side space S1 and the Pc side space S2.

Third Embodiment

A capacity control valve according to a third embodiment of the present invention will be described with reference to FIG. 9. Incidentally, a description of duplicated configurations that are the same as the configurations of the first and second embodiments will be omitted.

Figure 9:
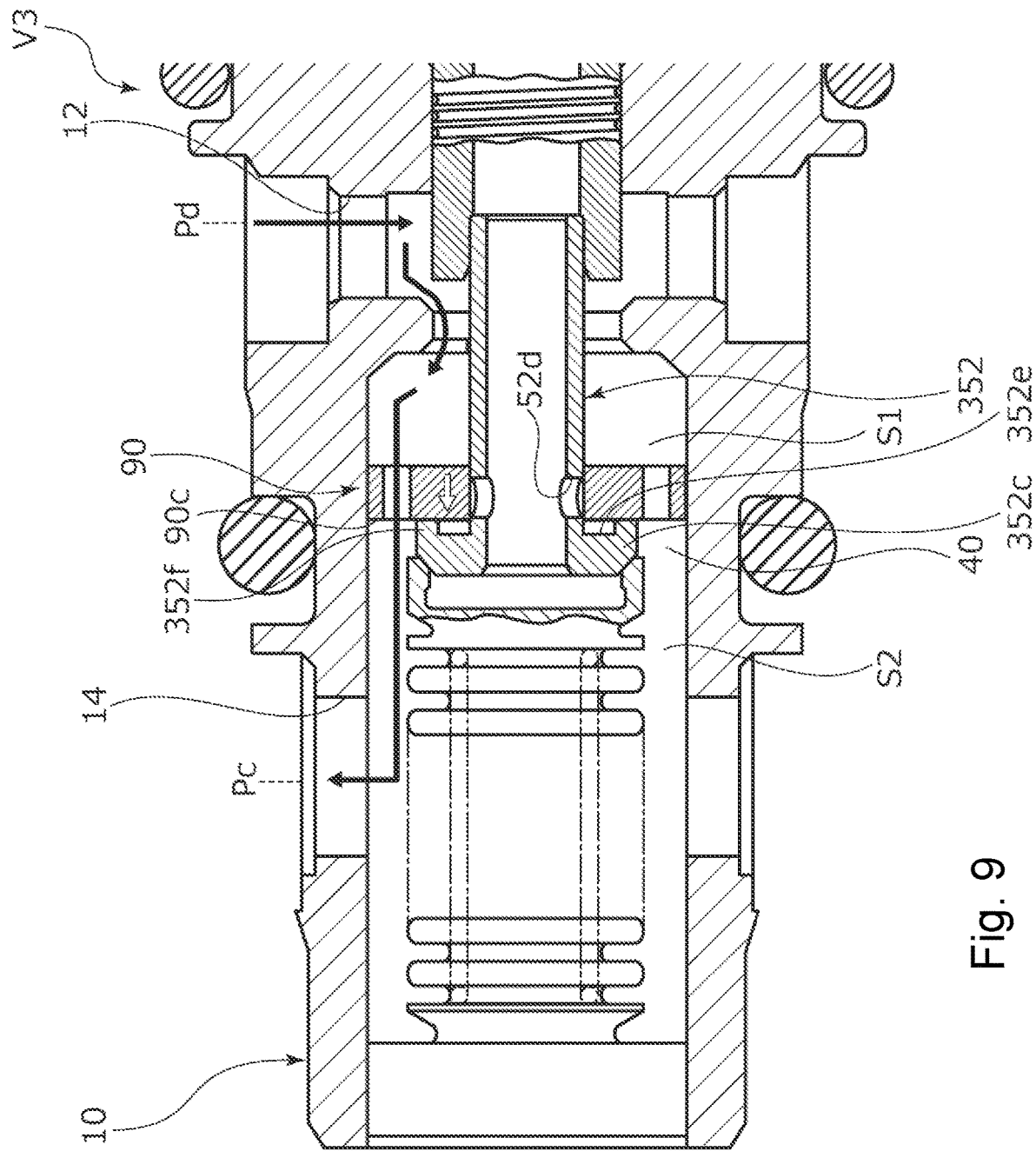
FIG. 9 is an enlarged cross-sectional view showing a state where a main valve is opened and through-holes of a pressure sensitive valve member are closed by a slide valve body in a non-energized state of a capacity control valve according to a third embodiment of the present invention.

As shown in FIG. 9, in a capacity control valve V3 of the third embodiment, a pressure sensitive valve member 352 is integrally provided with a projection 352f having an annular shape and protruding from a radially outer portion of a side surface 352e on an axially right side of a flange portion 352c to the right in the axial direction. Incidentally, the projection 352f is not limited to being formed in an annular shape, and a plurality of the projections 352f may be evenly disposed in the circumferential direction. In addition, a member separated from the pressure sensitive valve member 352 may be fixed to the side surface 352e of the flange portion 352c to form the projection 352f.

Accordingly, in a state where the through-holes 52d of the pressure sensitive valve member 352 are closed by the slide valve body 90, a tip surface of the projection 352f is in contact with the side surface 90c of on the axially left side of the slide valve body 90 to prevent surface-to-surface contact between the side surface 90c on the axially left side of the slide valve body 90 and the side surface 352e of the flange portion 352c of the pressure sensitive valve member 352, so that the slide valve body 90 can be easily separated from the pressure sensitive valve member 352, and the responsiveness of the slide valve body 90 can be improved.

Fourth Embodiment

A capacity control valve according to a fourth embodiment of the present invention will be described with reference to FIG. 10. Incidentally, a description of duplicated configurations that are the same as the configurations of the first to third embodiments will be omitted.

Figure 10:
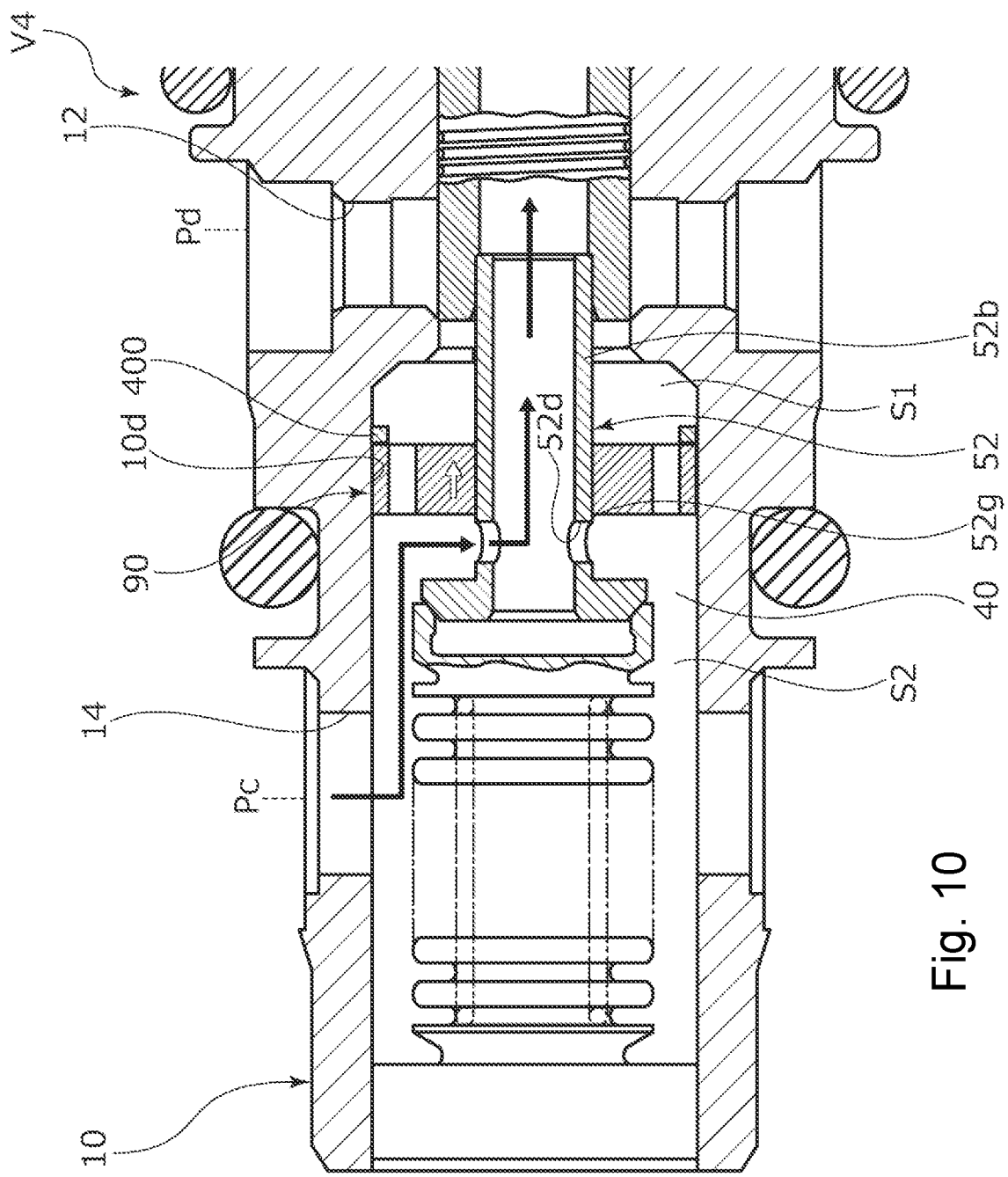
FIG. 10 is an enlarged cross-sectional view showing a state where a main valve is opened and through-holes of a pressure sensitive valve member are closed by a slide valve body in a non-energized state of a capacity control valve according to a fourth embodiment of the present invention.

As shown in FIG. 10, in a capacity control valve V4 of the fourth embodiment, a stopper 400 having an annular shape which restricts movement of the slide valve body 90 in the opening direction, namely, to the right in the axial direction is fixed to the inner peripheral surface 10d of the valve housing 10 on the axially right side of the slide valve body 90 in the pressure sensitive chamber 40. Incidentally, the stopper 400 is not limited to being formed in an annular shape, and a plurality of the stoppers 400 may be evenly disposed in the circumferential direction. In addition, the stopper may be fixed to the outer peripheral surface 52g of the base portion 52b of the pressure sensitive valve member 52.

Accordingly, since the stopper 400 can specify the amount of movement of the slide valve body 90 to the right in the axial direction when the valve is opened, the controllability of the slide valve body 90 is high.

The embodiments of the present invention have been described above with reference to the drawings; however, the specific configurations are not limited to the embodiments, and the present invention also includes changes or additions that are made without departing from the scope of the present invention.

For example, in the embodiment, the slide valve body has been described as reciprocating relative to the pressure sensitive valve member in the axial direction; however, the present invention is not limited to the configuration and, for example, the slide valve body may reciprocate relative to the pressure sensitive valve member in the axial direction while rotating and sliding with respect to the pressure sensitive valve member.

In addition, in the embodiments, the thickness dimension L1 of the slide valve body has been described as being larger than the diameter R1 of the through-hole of the pressure sensitive valve member (i.e., L1>R1), but the present invention is not limited thereto, and a relationship in size between the thickness dimension L1 of the slide valve body and the diameter R1 of the through-hole of the pressure sensitive valve member may be L1=R1 or L1<R1. Namely, regarding the closing of the through-holes of the pressure sensitive valve member, the through-holes may not be completely closed by the slide valve body.

In addition, in the embodiments, an example has been described in which the main and auxiliary valve body and the pressure sensitive valve member are formed as separate bodies, but both may be integrally formed.

In addition, the slide valve body may be divided into a plurality of segments in the circumferential direction.

In addition, in the embodiments, the inner peripheral surface of the slide valve body has been described as sliding on the outer peripheral surface of the base portion of the pressure sensitive valve member, but the present invention is not limited to the configuration, and the outer peripheral surface of the slide valve body may slide on the inner peripheral surface 10d of the valve housing 10. Incidentally, in this case, it is preferable that the very small gap formed between the outer peripheral surface of the slide valve body and the inner peripheral surface 10d of the valve housing 10 is formed to be smaller than the very small gap formed between the inner peripheral surface of the slide valve body and the outer peripheral surface of the base portion of the pressure sensitive valve member. Furthermore, it is preferable that the slide valve body is made of a material different from that of the valve housing.

In addition, in the pressure sensitive valve member, the base portion and the flange portion may be separately formed.

In addition, the communication passage and the fixed orifice that provide direct communication between the control chamber 4 and the suction chamber 3 of the variable displacement compressor M may not be provided.

In addition, the auxiliary valve 54 may not be provided, and as long as the step portion 51*b* on the axially right side of the main and auxiliary valve body 51 functions as a support member that receives an axial load, a sealing function of the step portion 51*b* is not necessarily required.

In addition, the pressure sensitive chamber 40 may be provided on an axially right side of the main valve chamber 20 in which the solenoid 80 is provided, and the auxiliary valve chamber 30 may be provided on an axially left side of the main valve chamber 20.

In addition, a coil spring may not be used inside the pressure sensitive body 60.

In addition, the opening degree or the opening time of the main valve 50 may be adjusted by duty control of the capacity control valve to control the flow rate of the fluid from the Pd port 12 to the Pc port 14, and to adjust the amount of movement of the slide valve body to the left in the axial direction, and the opening degree of the through-holes 52*d* of the pressure sensitive valve member 52 may be adjusted by the slide valve body. Accordingly, the flow rate of the fluid flowing from the Pc port 14 to the Ps port 13 can be adjusted.

REFERENCE SIGNS LIST

1 Casing
2 Discharge chamber
3 Suction chamber
4 Control chamber
10 Valve housing
10*a* Main valve seat
10*c* Annular protrusion
11 Partition adjustment member
12 Pd port (discharge port)
13 Ps port (suction port)
14 Pc port (control port)
20 Main valve chamber
30 Auxiliary valve chamber
40 Pressure sensitive chamber
50 Main valve
51 Main and auxiliary valve body (valve body)
51*c* Through-hole
52 Pressure sensitive valve member
52*a* Pressure sensitive valve seat
52*b* Base portion
52*c* Flange portion
52*d* Through-hole
52*e* Side surface
53 Pressure sensitive valve
54 Auxiliary valve
55 Intermediate communication passage
60 Pressure sensitive body
70 Adapter
70*a* Axially right end surface
80 Solenoid
90 Slide valve body
90*a* Through-hole
90*b* Communication hole (Pd-Pc flow passage)
90*c* Side surface
90*d* Side surface
190 Slide valve body
190*b* Cutout (Pd-Pc flow passage)
290 Slide valve body
290*e* Projection
352 Pressure sensitive valve member
352*f* Projection
400 Stopper
M Variable displacement compressor
S1 Pd side space
S2 Pc side space
V1 to V4 Capacity control valve

The invention claimed is:

1. A capacity control valve comprising:
a valve housing provided with a discharge port through which a discharge fluid of a discharge pressure passes, a suction port through which a suction fluid of a suction pressure passes, and a control port through which a control fluid of a control pressure passes;
a main valve including a valve body driven by a solenoid, and a main valve seat which is provided between the discharge port and the control port and with which the valve body is allowed to come into contact;
a pressure sensitive body disposed in a pressure sensitive chamber; and
a pressure sensitive valve member extending from the valve body to the pressure sensitive chamber and forming a pressure sensitive valve, together with the pressure sensitive body,
wherein an intermediate communication passage is formed in the valve body and in the pressure sensitive valve member, and the control port and the suction port are allowed to communicate with each other through the intermediate communication passage by opening the pressure sensitive valve,
wherein the pressure sensitive valve member is provided with a through-hole communicating with the intermediate communication passage and has a slide valve body attached thereto such that the slide valve body slides relative to the pressure sensitive valve member in the pressure sensitive chamber to open and close the through-hole, and
wherein the slide valve body partitions the pressure sensitive chamber into a Pd side space on a side of the discharge port and a Pc side space on a side of the control port, and a Pd-Pc flow passage providing communication between the Pd side space and the Pc side space is formed in the slide valve body.

2. The capacity control valve according to claim 1, wherein the slide valve body slides along an outer peripheral surface of the pressure sensitive valve member.

3. The capacity control valve according to claim 2, wherein the Pd-Pc flow passage is formed by a communication hole penetrating through the slide valve body in an axial direction.

4. The capacity control valve according to claim 2, wherein a plurality of the Pd-Pc flow passages are evenly disposed in a circumferential direction.

5. The capacity control valve according to claim 2, wherein a projection is provided between the slide valve body and a flange portion formed on a tip side of the pressure sensitive valve member.

6. The capacity control valve according to claim 5, wherein the projection is formed in the slide valve body so as to protrude toward the flange portion.

7. The capacity control valve according to claim 2, wherein the valve housing is provided with a stopper that restricts movement of the slide valve body in an opening direction.

8. The capacity control valve according to claim 1,
wherein the Pd-Pc flow passage is formed by a communication hole penetrating through the slide valve body in an axial direction.

9. The capacity control valve according to claim 8,
wherein a plurality of the Pd-Pc flow passages are evenly disposed in a circumferential direction.

10. The capacity control valve according to claim 8,
wherein a projection is provided between the slide valve body and a flange portion formed on a tip side of the pressure sensitive valve member.

11. The capacity control valve according to claim 10,
wherein the projection is formed in the slide valve body so as to protrude toward the flange portion.

12. The capacity control valve according to claim 10,
wherein the projection is formed in the slide valve body so as to protrude toward the flange portion.

13. The capacity control valve according to claim 8,
wherein the valve housing is provided with a stopper that restricts movement of the slide valve body in an opening direction.

14. The capacity control valve according to claim 1,
wherein a plurality of the Pd-Pc flow passages are evenly disposed in a circumferential direction.

15. The capacity control valve according to claim 14,
wherein a projection is provided between the slide valve body and a flange portion formed on a tip side of the pressure sensitive valve member.

16. The capacity control valve according to claim 14,
wherein the valve housing is provided with a stopper that restricts movement of the slide valve body in an opening direction.

17. The capacity control valve according to claim 1,
wherein a projection is provided between the slide valve body and a flange portion formed on a tip side of the pressure sensitive valve member.

18. The capacity control valve according to claim 17,
wherein the projection is formed in the slide valve body so as to protrude toward the flange portion.

19. The capacity control valve according to claim 17,
wherein the valve housing is provided with a stopper that restricts movement of the slide valve body in an opening direction.

20. The capacity control valve according to claim 1,
wherein the valve housing is provided with a stopper that restricts movement of the slide valve body in an opening direction.

* * * * *